US008584515B2

(12) United States Patent
Fischer et al.

(10) Patent No.: US 8,584,515 B2
(45) Date of Patent: Nov. 19, 2013

(54) METHOD AND CONTROL UNIT FOR OPERATING AN INJECTION VALVE

(75) Inventors: Wolfgang Fischer, Gerlingen (DE); Silke Seuling, Kornwestheim (DE); Christian Grosse, Kornwestheim (DE); Helerson Kemmer, Vaihingen (DE); Werner Haeming, Neudenau (DE)

(73) Assignee: Robert Bosch GmbH, Stuttgart (DE)

( * ) Notice: Subject to any disclaimer, the term of this patent is extended or adjusted under 35 U.S.C. 154(b) by 1084 days.

(21) Appl. No.: 12/571,851

(22) Filed: Oct. 1, 2009

(65) Prior Publication Data

US 2010/0116252 A1 May 13, 2010

(30) Foreign Application Priority Data

Oct. 2, 2008 (DE) ......................... 10 2008 042 556

(51) Int. Cl.
*G01M 15/04* (2006.01)

(52) U.S. Cl.
USPC ....................................................... 73/114.45

(58) Field of Classification Search
USPC ....................................................... 73/114.45
See application file for complete search history.

(56) References Cited

U.S. PATENT DOCUMENTS

| | | | | |
|---|---|---|---|---|
| 5,477,149 | A | 12/1995 | Spencer et al. | |
| 5,524,484 | A | 6/1996 | Sullivan | |
| 5,934,256 | A * | 8/1999 | Wenzlawski et al. | 123/479 |
| 7,322,340 | B2 * | 1/2008 | Ohga | 123/299 |
| 8,099,231 | B1 * | 1/2012 | Suwa | 701/111 |
| 2007/0131203 | A1 * | 6/2007 | Ohga | 123/478 |
| 2012/0144907 | A1 * | 6/2012 | Komatsu | 73/114.51 |

FOREIGN PATENT DOCUMENTS

| | | |
|---|---|---|
| DE | 44 13 473 | 10/1995 |
| EP | 0 637 713 | 2/1995 |

* cited by examiner

*Primary Examiner* — Freddie Kirkland, III
(74) *Attorney, Agent, or Firm* — Kenyon & Kenyon LLP

(57) ABSTRACT

In a method for operating an injection valve, in particular a fuel injector of an internal combustion engine of a motor vehicle, one component of the injection valve, particularly a valve needle, is disposed in a manner allowing movement relative to other components of the injection valve, and preferably is able to be driven at least partially by an actuator. A structure-borne-noise signal is detected by a structure-borne-noise sensor, and the structure-borne-noise signal is evaluated in order to infer an operating state of the movably disposed component.

22 Claims, 6 Drawing Sheets

METHOD AND CONTROL UNIT FOR OPERATING AN INJECTION VALVE

CROSS-REFERENCE TO RELATED APPLICATIONS

The present application claims priority to Application No. 10 2008 042 556.7, filed in the Federal Republic of Germany on Oct. 2, 2008, which is expressly incorporated herein in its entirety by reference thereto.

FIELD OF THE INVENTION

The present invention relates to a method for operating an injection valve, in particular a fuel injector of an internal combustion engine of a motor vehicle, in which one component of the injection valve, particularly a valve needle, is disposed in a manner allowing movement relative to other components of the injection valve, and preferably is able to be driven at least partially by an actuator.

The present invention further relates to a control unit for such an injection valve.

SUMMARY

Example embodiments of the present invention provide a method and a control unit of the kind indicated at the outset to the effect that a more precise operation of the injection valve is possible, especially in the case of changing operating parameters such as temperature, fuel pressure and the appearance of signs of wear, as well.

According to example embodiments of the present invention, a structure-borne-noise signal is detected by a structure-borne-noise sensor, and the structure-borne-noise signal is evaluated in order to infer an operating state of the movably disposed component.

The evaluation of the structure-borne-noise signal makes it possible to draw particularly precise conclusions about the operational performance or the state of individual components of the injection valve. In particular, compared to conventional methods which, for example, provide for an analysis of the control variables (control current, voltage) of the injection valve, it is also possible to determine when one or more movable components of the injection valve such as, for example, the valve needle, strike against a stop delimiting their travel. That is, using the method described herein, it is also possible to obtain information about changes in the state of internal components of the injection valve.

The evaluation of the structure-borne-noise signal may be simplified when the structure-borne-noise signal is detected in a specifiable detection time range during an operating cycle of the injection valve which is selected as a function of at least one control variable of the actuator. Since usually those operating states or changes in the state of the injection valve or of its movably disposed components are of special interest which occur as a result of the actuator being activated, the time range of the structure-borne-noise signal to be evaluated may be limited particularly advantageously to the time ranges of interest, as a function of the control variable known as a rule.

Alternatively or additionally, the method also allows the evaluation of structure-borne-noise signals which do not develop directly as a result of an activation of the actuator, but rather, for example, due to a change in pressure conditions of a fluid located in the injection valve or other processes generating structure-borne noise. In this instance, the detection time range considered is to be selected accordingly. Furthermore, a continuous acquisition and evaluation of a structure-borne-noise signal is considered, so that upon the occurrence of relevant ranges of the structure-borne-noise signal, for example, a range to be analyzed more precisely may first be determined later.

The method may include selecting the detection time range such that it includes an estimated instant of impact at which the movably disposed component strikes a further component of the injection valve, especially a valve seat and/or a lift stop. With knowledge of the mechanical or hydraulic configuration of the injection valve, the estimated instant of impact may be ascertained, for example, with the aid of a suitable model. Advantageously, the detection time range around the estimated instant of impact may also include tolerance ranges, which take into account the limited exactitude in estimating the instant of the occurrence of the event generating structure-borne noise.

The structure-borne-noise signal may be evaluated particularly advantageously to the effect that an actual instant the movably disposed component strikes a further component of the injection valve, for example, the instant the valve needle strikes the valve seat, is ascertained. In this manner, it is possible in particular to determine the position in time of the actual hydraulic opening or closing of the injection valve, which may occasionally deviate considerably from corresponding changes in the state of a control signal.

Alternatively or additionally, it is possible to monitor further events generating structure-borne noise characteristic for the operation of the injection valve, for example, the lifting of a valve needle from its seat or the striking of a magnet armature on a lift stop assigned to it.

In principle, the operational method is suitable for any injection valve which has at least one movable component and therefore is able to generate structure-borne-noise signals. In particular, the operational method may be used advantageously with high-pressure injection valves, where the valve needle is driven via an electromagnetic actuator. The use of the operational method described herein for injection valves having valve needles driven piezoelectrically or hydraulically is possible.

Further features and aspects of example embodiments of the present invention are described in more detail below with reference to the appended Figures.

DETAILED DESCRIPTION

Figure 1:
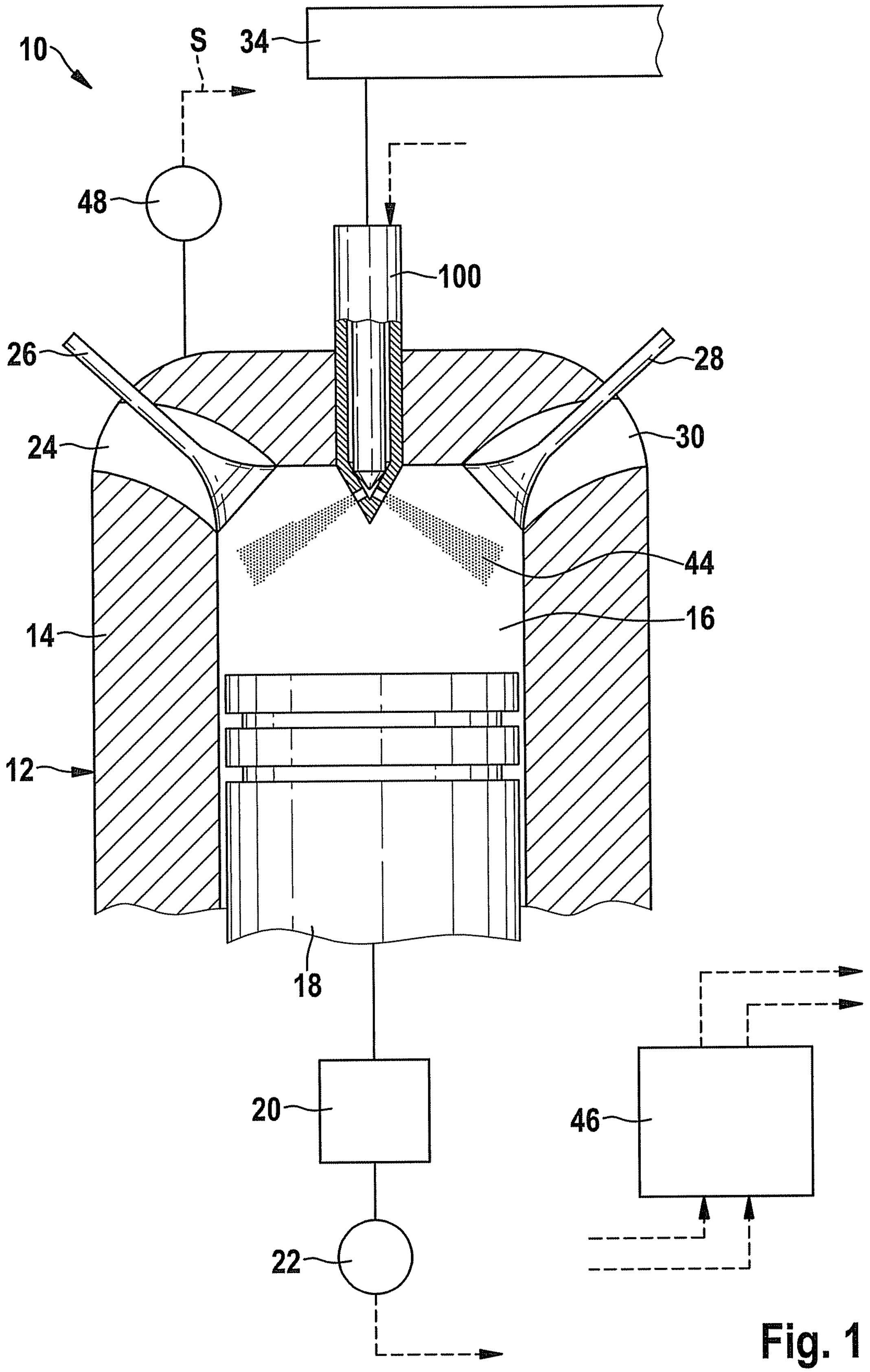
FIG. 1 is a schematic, partial cross-sectional view through a cylinder of an internal combustion engine of a motor vehicle.

In FIG. 1, an internal combustion engine is designated overall by reference numeral 10. It includes a plurality of cylinders, of which only one having reference numeral 12 is shown in FIG. 1. Cylinder 12 is disposed in an engine block 14, and includes a combustion chamber 16 which is bounded by a piston 18. Piston 18 sets a crankshaft 20 into rotation, whose rotational speed and position are sensed by a crankshaft sensor 22.

Intake air arrives in combustion chamber 16 via an intake port 24 and an intake valve 26. The combustion emissions are conducted via an exhaust valve 28 into an exhaust duct 30. Fuel 44 is injected directly into combustion chamber 16 by an injection valve 100. A fuel-pressure accumulator 34, taking the form of a common rail, for instance, is connected to injection valve 100 via a pressure line.

The operation of internal combustion engine 10 and especially of injection valve 100, as well, is controlled and regulated by control unit 46. Control unit 46 receives signals from crankshaft sensor 22, for instance, as well as from a structure-borne-noise sensor 48 that is connected to engine block 14. Control unit 46 has an electronic memory element on which a computer program is stored that is designed to execute the method according to example embodiments of the present invention described in greater detail in the following.

Figure 2:
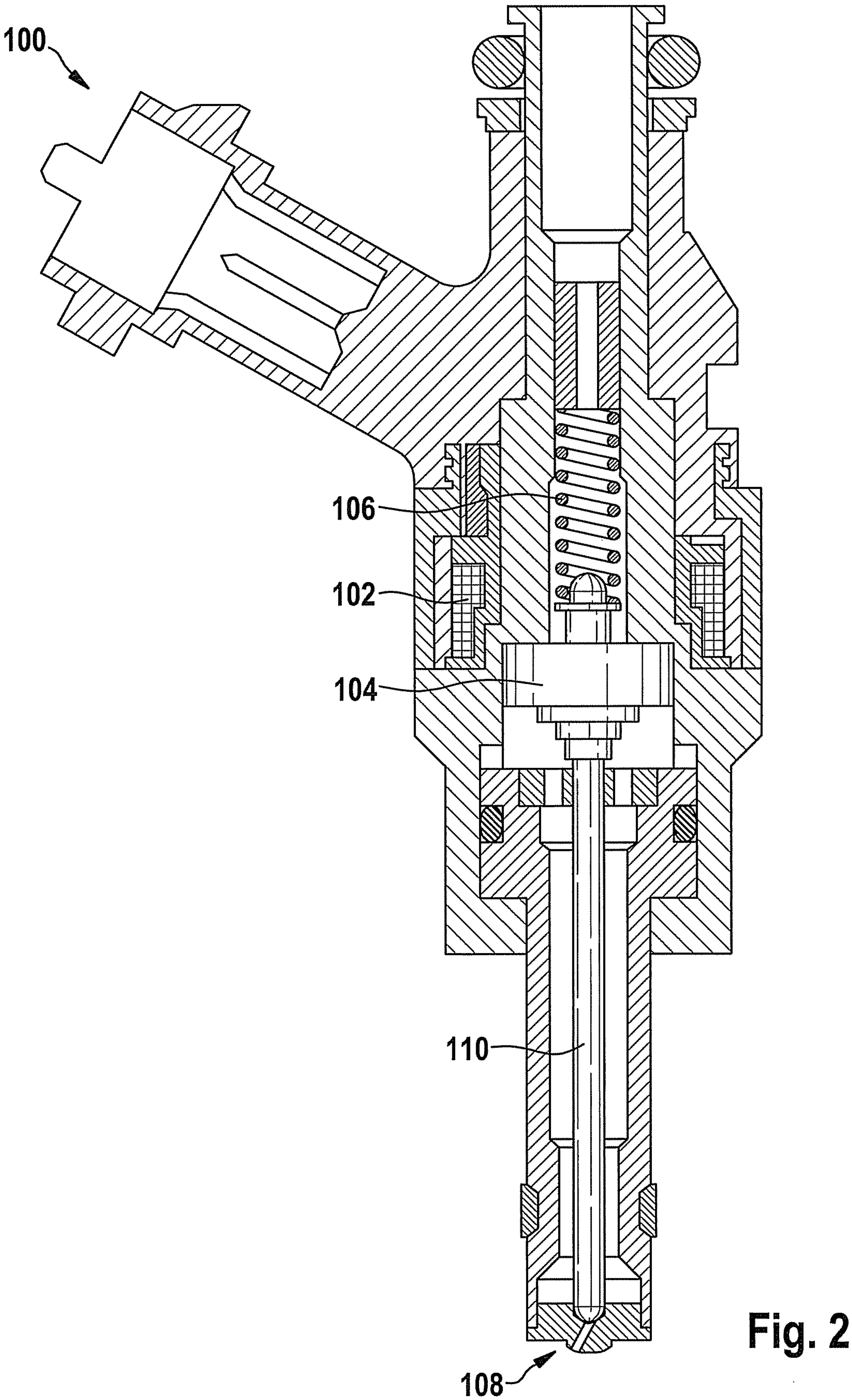
FIG. 2 is a schematic, partial cross-sectional view through an injection valve of the internal combustion engine according to FIG. 1.

FIG. 2 shows injection valve 100 from FIG. 1 in a detailed view. Injection valve 100 has an electromagnetic actuator for driving a valve needle 110, the actuator being formed by a magnet coil 102 and a magnet armature 104 cooperating with magnet coil 102, as apparent from FIG. 2. Magnet armature 104 is joined to valve needle 110 in a manner familiar to one skilled in the art in order to move the valve needle out of its closed position, shown in FIG. 2, in the area of spray holes 108 against the spring force of valve spring 106, so that fuel 44 may be injected into combustion chamber 16 (FIG. 1).

In order to attain a fuel injection, magnet coil 102 of injection valve 100 is acted upon, e.g., in a conventional manner, by a control signal, preferably by a control current. Current-carrying magnet coil 102 exerts a magnetic force on magnet armature 104 and moves it up in FIG. 2. During this movement, magnet armature 104 takes along valve needle 110 and thus lifts it out of its closed position against the spring force of valve spring 106, so that fuel may be injected through spray holes 108.

After the current application, magnetic force no longer acts on magnet armature 104, and it, together with valve needle 110, is moved downward in FIG. 2 by valve spring 106, so that valve needle 110 ultimately assumes its closed position again, shown in FIG. 2, and the fuel injection is ended.

According to example embodiments of the present invention, a structure-borne-noise signal S, which emanates from injection valve 100, is detected by structure-borne-noise sensor 48 (FIG. 1). An evaluation is carried out as a function of structure-borne-noise signal S, in order to infer an operating state of injection valve 100, particularly of its valve needle 110 and/or of magnet armature 104.

Figure 3:
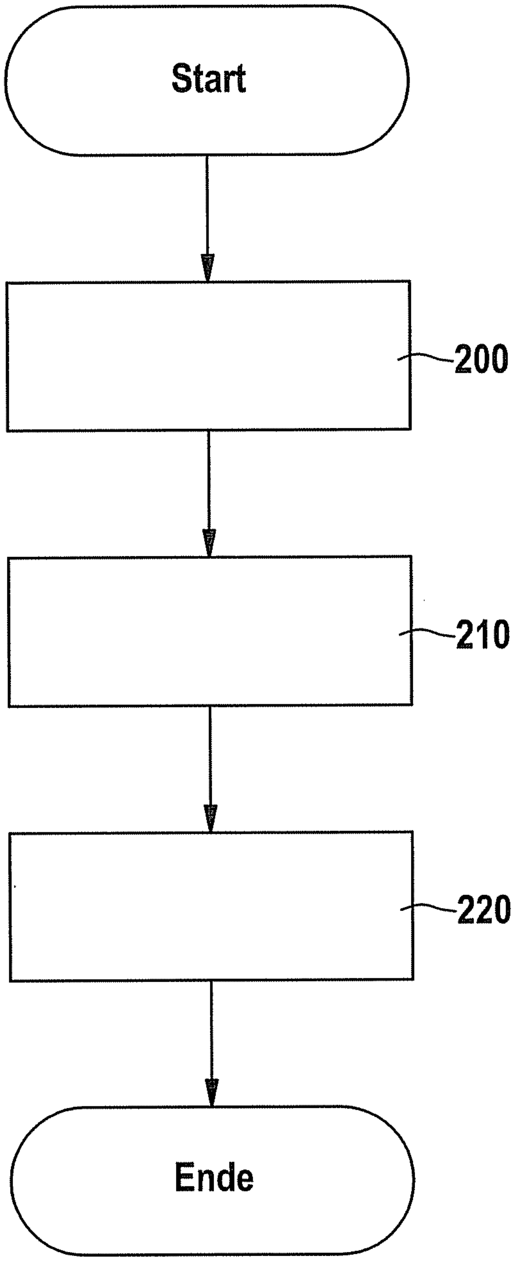
FIG. 3 shows a simplified flow chart of a method according to an example embodiment of the present invention.

FIG. 3 shows a simplified flow chart of a method according to an example embodiment of the present invention. In a first method step 200, structure-borne-noise signal S is detected with the aid of structure-borne-noise sensor 48. In following method step 210, acquired structure-borne-noise signal S is evaluated in order to deduce an operating state of injection valve 100.

As a function of the findings about the operating state of injection valve 100 obtained in step 210, in a further method step 220, control parameters may advantageously be formed or modified for injection valve 100. In doing this, it is advantageously possible to adapt the control parameters like, for example, a control current for magnet coil 102 (FIG. 2) of injection valve 100 in such a manner to the actual operating state of injection valve 100 that as precise a fuel injection as possible is permitted.

The evaluation in step 210 may include a filtering of structure-borne-noise signal S (FIG. 1), a band-pass filtering being considered in particular. In this manner, it is advantageously possible to select for the evaluation, those signal portions contained in structure-borne-noise signal S which are of special interest. Given a suitable selection of the mid-frequency and the limit frequencies of the band-pass filter used, advantageously, those frequency portions of structure-borne-noise signal S which, for example, are attributable to components other than injection valve 100 may therefore be excluded from the evaluation, and are to be considered as disturbance variable for the evaluation.

As an alternative to the band-pass filtering, preferably a high-pass filtering of structure-borne-noise signal S may also be carried out.

In the course of evaluation 210, after the band-pass filtering has been performed, for example, the filtered structure-borne-noise signal may be compared to a specifiable threshold value. If the band-pass-filtered structure-borne-noise signal exceeds the specifiable threshold value, it may be inferred that a movable component of injection valve 100 has struck a further component of injection valve 100, whereby a structure-borne-noise signal S with correspondingly great amplitude has been generated.

In the case of injection valve 100 illustrated in FIG. 2, under evaluation 210 of structure-borne-noise signal S, it is possible to particularly reliably recognize the following operating states, in response to which evaluable structure-borne-noise signals are obtained:

a) Striking of valve needle 110 on a valve seat in the area of spray holes 108, b) Striking of magnet armature 104 on a bottom stop in FIG. 2, c) Striking of magnet armature 104 on an upper stop in FIG. 2 in the area of magnet coil 102, d) Onset of the carrying-along of valve needle 110 by magnet armature 104.

In response to each of the events or operating states indicated above, a structure-borne-noise signal S of a particular signal form, i.e., especially having a characteristic frequency and amplitude, is generated, which is evaluable using the method described herein.

The principles described herein may also be applied to other types of injection valves, for instance, to injection valves which have an electromagnetically driven servo valve. Moreover, the principles described herein are also transferable to those injection valves in which a movable component of the injection valve is driven by a piezoelectric actuator.

Alternatively or in addition to the band-pass filtering described above, acquired structure-borne-noise signal S may also be rectified and integrated over a specifiable period of time, thereby obtaining a measure for the signal energy of structure-borne-noise signal S.

Instead of the rectification, which corresponds mathematically to an absolute-value generation, the individual sampling values of structure-borne-noise signal S may also be squared before the integration is carried out.

Alternatively or additionally, one or more spectral components of a power density spectrum of structure-borne-noise signal S may also be analyzed, particularly again with implementation of a threshold-value comparison. The power density spectrum of structure-borne-noise signal S may be obtained, e.g., in a conventional manner, for instance, with the aid of a fast Fourier transform (FFT) or a discrete Fourier transform (DFT).

The variables derived from structure-borne-noise signal S and obtained using the evaluation methods described above, may be checked as to whether they exceed a corresponding threshold value to infer from that, for example, one of the above-indicated events a), b), c), d) producing structure-borne noise.

The threshold values used during evaluation 210 (FIG. 3) may be established in the application, for example, or may also be modified dynamically. In this context, consideration is given in particular to altering an existing threshold value as a function of one or more previous evaluations 210 of structure-borne-noise signal S. For example, the method may be carried out over a plurality of similar working cycles of injection valve 100, and suitable threshold values may be obtained in self-learning fashion directly from structure-borne-noise signals S obtained in so doing, or from the variables derived from them.

According to example embodiments of the present invention, an evaluation of structure-borne-noise signal S which is particularly robust with respect to interference signals is provided by normalizing structure-borne-noise signal S to be evaluated and/or a signal derived from it, to a reference signal. For example, a structure-borne-noise signal S which is acquired over a comparable period of time and which is ascertained in an operating phase of injection valve 100 in which no structure-borne-noise events produced by movable components 104, 110 are to be expected may be used as reference signal. Accordingly, the reference signal contains solely those structure-borne-noise-signal components which are produced by other processes in injection valve 100 and, in particular, in internal combustion engine 10, that are not to be evaluated.

The detection time range within which structure-borne-noise signal S is to be acquired is advantageously selected as a function of at least one control variable of injection valve 100. In particular, to precisely limit the detection time range, a control current of magnet coil 102 may be evaluated. The detection time range is advantageously selected so that it includes at least one estimated instant of impact at which movably disposed component 104, 110 strikes another component of injection valve 100, especially the valve seat or a lift stop.

In step 210, acquired structure-borne-noise signal S may also be correlated with a reference signal that has been ascertained in connection with a reference system, for example, and has been stored in non-volatile manner in a memory of control unit 46.

The correlation may be carried out, e.g., in a conventional manner, in that a temporal shift, at which the correlation result is at its maximum, is sought between the reference signal and acquired structure-borne-noise signal S. This temporal shift corresponds to the temporal shift between an actual instant of impact of the movable component of injection valve 100 considered, with respect to the instant of impact of the reference system.

An example embodiment of the present invention is described in the following with reference to the flow chart according to FIG. 4. This method provides for implementing a plurality of test activations of actuator 102, 104, during which in each instance, actuator 102, 104 receives different control signals, a plurality of structure-borne-noise signals corresponding in each case to the different test activations being obtained, and the operating state of injection valve 100, particularly of its movably disposed components 104, 110, being inferred from the plurality of structure-borne-noise signals.

Figure 4:
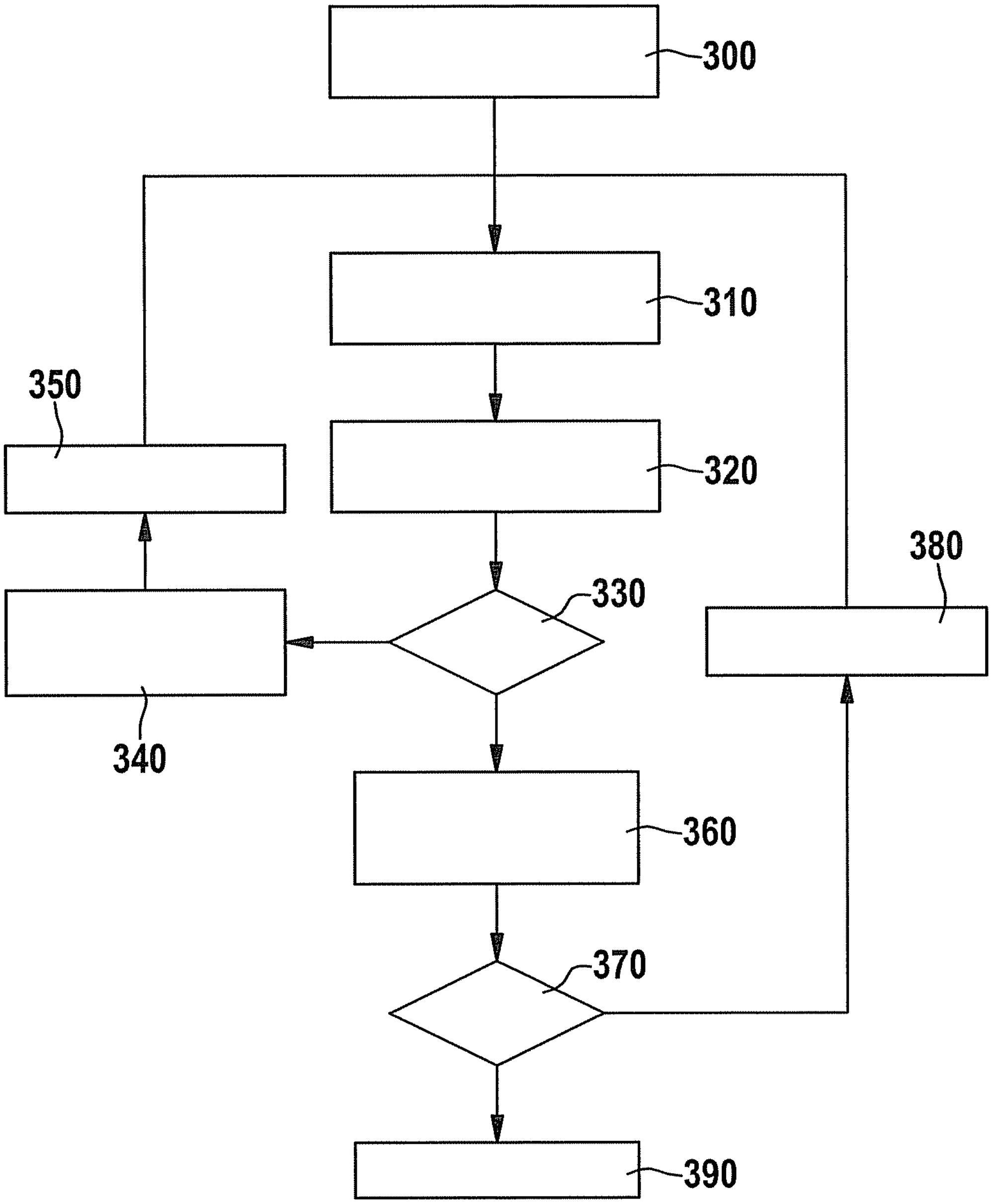
FIG. 4 shows a simplified flow chart of a method according to an example embodiment of the present invention.

That is to say, in contrast to the method variants described with reference to the flow chart according to FIG. 3, the method variant according to FIG. 4 provides for an evaluation of such structure-borne-noise signals S as are obtained under separate test activations of actuator 102, 104 carried out especially for that purpose, and not such structure-borne-noise signals S as occur during a conventional operation of injection valve 100.

Assuming the type of injection valve illustrated in FIG. 2, a control current is again considered as control signal. In each instance, an activation period may be modified for the plurality of test activations. That is, each of the test activations is carried out with an activation period assigned to it, which is different from the activation periods for the other test activations.

In a first step 300 of the method illustrated in FIG. 4, initially a starting value, in the present case, particularly a minimum value, is predefined for the activation period, and a first test activation is subsequently carried out using the minimum value for the activation period.

In the following step 310, a structure-borne-noise signal yielded during the first test activation is recorded.

To evaluate the recorded structure-borne-noise signal, in method step 320, a variable characterizing the energy of the recorded structure-borne-noise signal is ascertained in one of the procedures already described above, for example, by squaring the individual sampling values of the structure-borne-noise signal and subsequent integration. That is, after carrying out step 320 of the operational method, a variable is available characterizing the energy of the recorded structure-borne-noise signal.

In the present case, this variable represents a structure-borne-noise interference-signal energy, since for first step 300 of the method, a minimal activation period has been selected which, with certainty, would not already lead to a movement of valve needle 110 (FIG. 2), under actuation by actuator 102, 104. In particular, the minimal activation period may also be selected at zero for this purpose, so that actuator 102, 104 is actually not driven at all for the first test activation. Accordingly, no structure-borne-noise signal corresponding to a movement of components 104, 110 results based on the activation during method step 300, so that the structure-borne-noise signal evaluated in step 320 corresponds merely to an interference-signal energy.

In method step 330, it is thereupon checked whether preceding activation 310 is the first test activation. If this is the case, the method branches to step 340, in which the interference-signal energy, ascertained as described herein, of the structure-borne-noise signal recorded during the first test activation is stored for subsequent utilization. Thereupon, in step 350, the activation period for the following test activation is increased by a specifiable value.

Preferably, the increase in the activation period may follow a predefined test scheme that, for example, provides for a constant increment for the activation period, that is, with each further test activation, an activation period increased by a constant increment is used. Alternatively, the increment may also be selected not to be constant, in particular, it may be selected as a function of the number of test activations already implemented, or perhaps as a function of the activation period itself, and so forth.

After the activation period has been increased in step 350, a further test activation is carried out. To that end, the method again branches to step 310, as evident from FIG. 4. In step

320, a structure-borne-noise-signal energy is subsequently ascertained for the second test activation. Since the instantaneous test activation is no longer the first test activation for ascertaining the interference-signal energy, after the query in step 330, the method does not branch to step 340, but rather to step 360, which has as its object a special evaluation of the previously ascertained structure-borne-noise-signal energy.

In the present case, the evaluation of the structure-borne-noise-signal energy includes a division of the instantaneously ascertained structure-borne-noise-signal energy, that is, the structure-borne-noise-signal energy of the second test activation, by the interference-signal energy stored in step 340, by which a relative measure is obtained for the structure-borne-noise-signal energy.

Finally, in query 370, a threshold-value comparison is carried out, in which the relative measure for the structure-borne-noise-signal energy is checked with respect to the exceeding of a specifiable threshold value. If this is not the case, the method branches to step 380 which, just like method step 350, provides for a further increase in the activation period according to the predefined test scheme. Thereupon, the method again branches to step 310, which leads to the implementation of a third test activation, etc.

If the query in method step 370 reveals that the relative structure-borne-noise-signal energy mass from step 360 exceeds the specifiable threshold value, the method branches to step 390 in which, based on the exceeding of the threshold value, it is inferred that in response to the instantaneous test activation, an event has occurred in injection valve 100 causing a sufficiently strong structure-borne-noise signal S, e.g., the striking of valve needle 110 in its valve seat. Such an impact of valve needle 110 is only obtained after a sufficiently great activation period for electromagnetic actuator 102, 104, during which actuator 102, 104 initially lifts valve needle 110 from its valve seat, so that after the activation period, it is moved back into its valve seat under the effect of the spring force of valve spring 106.

Given suitable selection of the test scheme for the increase of the activation period, the method described above with reference to FIG. 4 permits a very precise ascertainment of the minimal activation period necessary for a fuel injection. Namely, only when the activation period is selected to be so great that valve needle 110 is actually moved out of its valve seat, is it possible for fuel 44 (FIG. 1) to be injected by injection valve 100. However, due to the above-described backward movement of valve needle 110 into its closed position in the area of the valve seat, the structure-borne-noise signal results in this case, as well.

Figure 5:
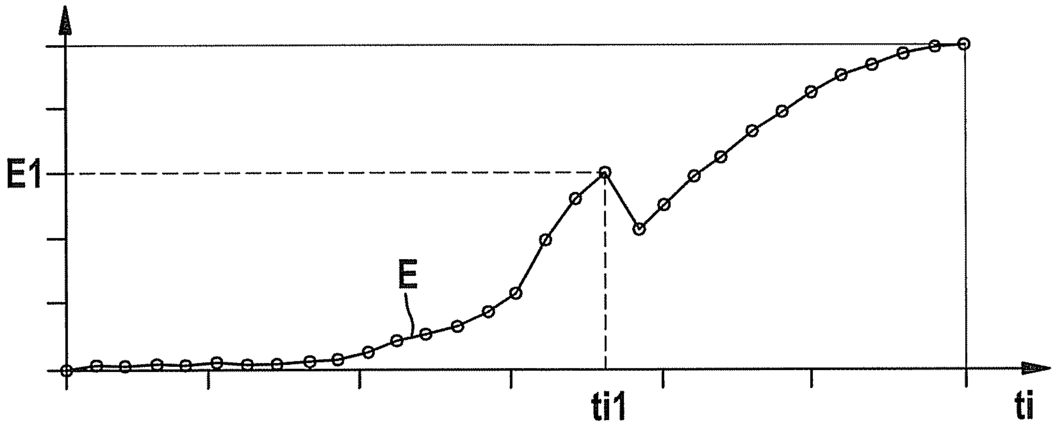
FIG. 5 illustrates a characteristic of a variable, obtained in the course of the evaluation of a structure-borne-noise signal, plotted over a control parameter of an injection valve.

FIG. 5 shows the variable E, ascertained during the execution of step 360 (FIG. 4) and representing an energy of the structure-borne-noise signal, plotted over the parameter activation period $t_i$. The diagram of FIG. 5 is obtained during an implementation of the method according to FIG. 4 using a constant increment for activation period $t_i$.

As soon as signal E illustrated in FIG. 5 exceeds specifiable threshold value E1 for the first time—starting from the minimal value for activation period $t_i$—in it is inferred in step 370 of the method according to FIG. 4 that activation period $t_i$ corresponding to it has been selected to be great enough to bring about a fuel injection.

That is, the activation periods where $t_i \leq t_{i1}$ are interpreted as not already resulting in a fuel injection. All activation periods where $t_i \leq t_{i1}$ are regarded by the evaluation as great enough to reliably bring about a fuel injection 100.

Accordingly, the operational method described above advantageously makes it possible to very precisely ascertain an actual minimal activation period $t_{i1}$, also denoted as pickup time, for a real injection valve 100. Consequently, in particular, especially small quantities of fuel may be injected far more precisely than when using conventional systems which utilize a predefined standard injection period that possibly does not take into account the particular properties of injection valve 100 considered, especially its wear, etc.

Figure 6A:
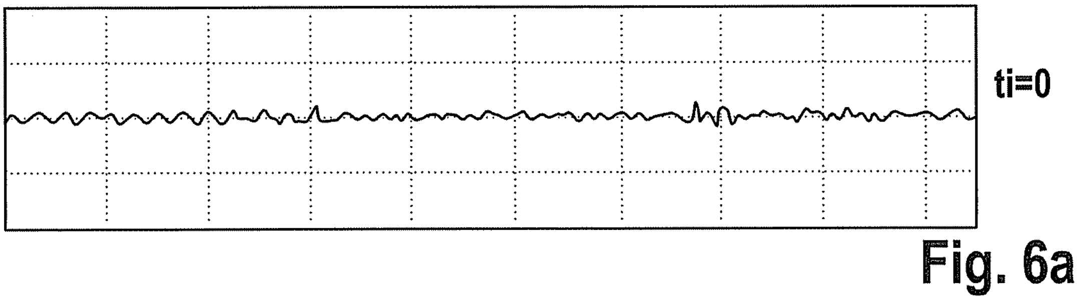
FIGS. 6*a*, 6*b*, and 6*c* each show a structure-borne-noise signal, acquired according to example embodiments of the present invention, for different values of a control parameter of an injection valve.
Figure 6B:
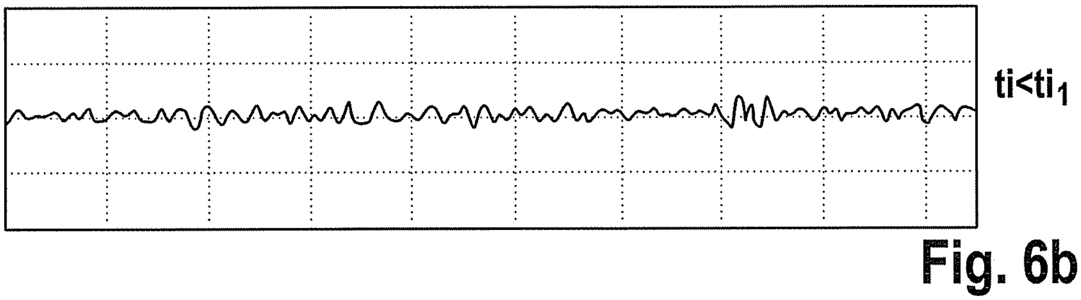
Figure 6C:
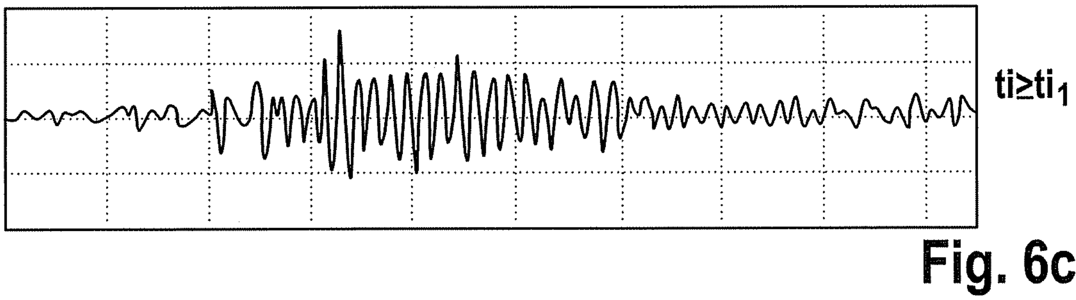

FIGS. 6*a*, 6*b*, and 6*c* show the time characteristic of structure-borne-noise signals as ascertained during three test activations 310 (FIG. 4) using different activation periods $t_i=0$, $t_i<t_{i1}$, $t_i>=t_{i1}$. It is apparent from the signal amplitudes in diagrams 6*a*, 6*b* that the structure-borne-noise signals in question exhibit no relatively great signal energy. In contrast, the structure-borne-noise signal portrayed in FIG. 6*c* exhibits markedly greater amplitude values, so that it may be inferred that in the case of this test activation, activation period $t_i$ has been great enough to bring about a lifting of valve needle 110 off of its valve seat and a subsequent striking of valve needle 110 on its valve seat, consequently, a fuel injection.

The scenarios shown in FIGS. 6*a*, 6*b*, and 6*c* each correspond to one measured value of the diagram illustrated in FIG. 5.

To further increase the precision of the method, in each case, a plurality of test activations 310 may also be carried out using the same activation period $t_i$, so that the results of the evaluation may be supported on averaged data, and are therefore correspondingly more precise.

Alternatively or in addition to a pure threshold-value comparison (see step 370 from FIG. 4) of variable E representing the energy of the structure-borne-noise signal, the characteristic shown in FIG. 5, as obtained during several cycles of the method according to FIG. 4, may also be evaluated to deduce the presence of a relevant event generating structure-borne noise. In particular, characteristic (variable) E may be analyzed for local extrema, for a deviation from a specifiable reference characteristic, etc. Specifiable threshold value E1 may also be determined particularly advantageously relative to other values of the curve shown in FIG. 5, for example, to such values for variable E which are obtained for $t_i=0$ or a maximum considered activation period $t_i$.

As already described, as a test scheme for specifying respective activation period $t_i$ for a corresponding test activation, in particular, an intelligent search function may also be used as a basis, in which, for example, the step size or the increment for increasing activation period $t_i$ is altered logarithmically. For instance, a vanishing activation period or a non-vanishing, minimally specifiable activation period may be selected as activation period for the first test activation. Accordingly, for a second test activation, an activation period may be selected, for example, that corresponds to half the maximum activation period which is predefined for implementing the method. Correspondingly, as activation period for a further test activation, a value may be selected which corresponds to 150% of the previous value, and so forth.

Based on the minimal activation period, i.e., the pickup time, ascertained as described above, it is possible to calibrate an injection characteristic curve stored in control unit 46 (FIG. 1) for injection valve 100. This may be accomplished, for instance, by shifting the characteristic curve, stored at the beginning in control unit 46, in accordance with the minimal activation period ascertained.

In the case of an internal combustion engine 10 having a plurality of cylinders 12, preferably the calibration of the injection characteristic curve may be carried out simultaneously for injection valves 100 of all cylinders 12. It is possible to apply the method to different injection valves 100 of internal combustion engine 10 in succession.

In addition to recognizing the striking of valve needle 110 in its valve seat, using the operational method, it is also possible to recognize the striking of magnet armature 104 on its upper stop in FIG. 2 in the area of magnet coil 102. A suitable method variant is illustrated by the flow chart indicated in FIG. 7.

In a first step 400, the activation period for the first test activation is already selected to be great enough that magnet armature 104 (FIG. 2) executes a lift which is as close as possible to its maximum possible full lift, in which magnet armature 104 actually strikes the upper lift stop. This activation period may be ascertained especially advantageously as a function of a pickup time obtained beforehand.

Subsequently in step 410, the first test activation is carried out, and a structure-borne-noise signal S resulting in so doing is recorded. In step 420, a variable is calculated which characterizes the energy of structure-borne-noise signal S, and which advantageously may in turn be related to an interference-signal energy ascertained beforehand.

Figure 7:
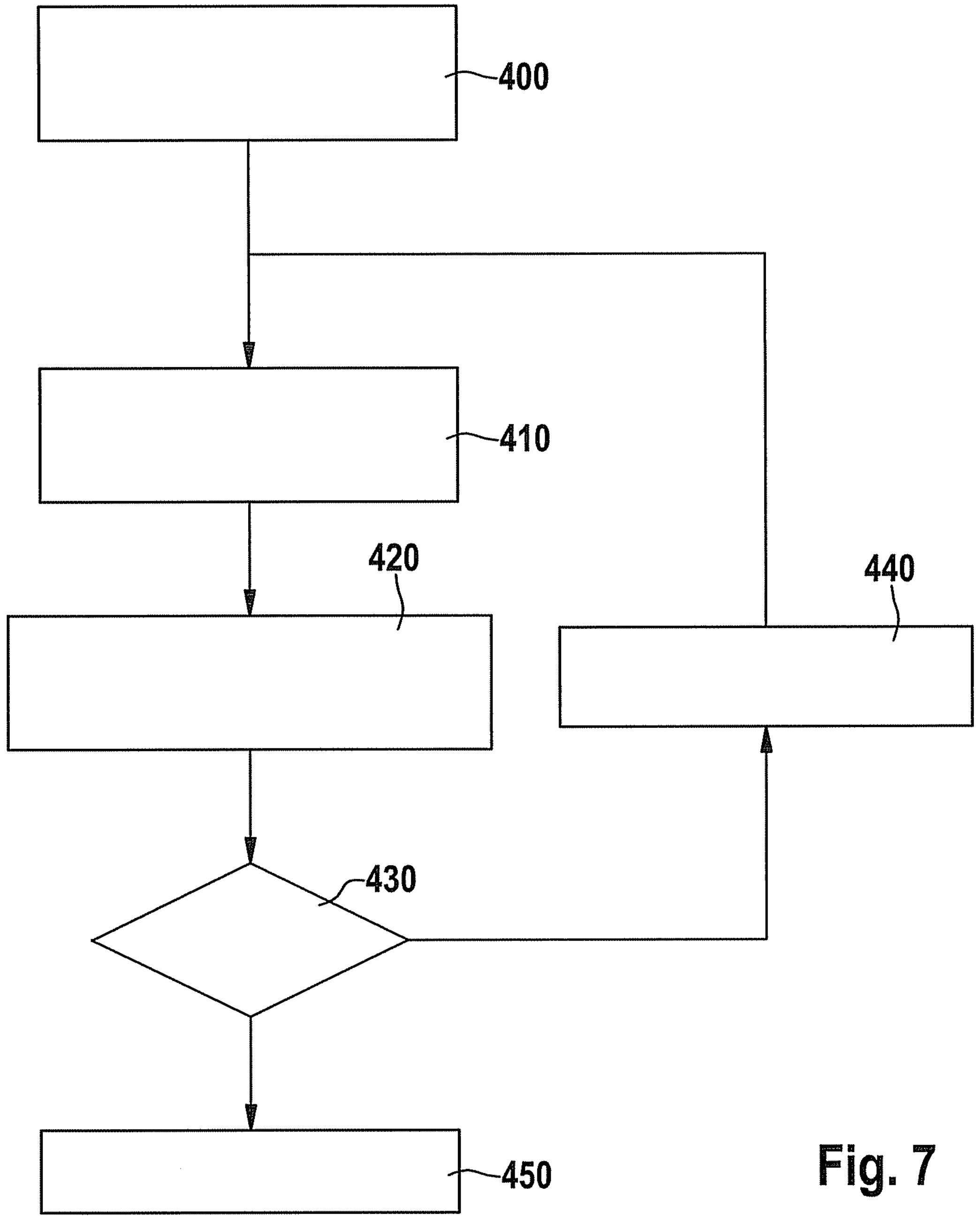
FIG. 7 shows a simplified flow chart of a method according to an example embodiment of the present invention.

A threshold-value comparison comparable to step 370 (FIG. 4) is carried out according to FIG. 7 in step 430. In this step 430, it is analyzed whether structure-borne-noise signal S obtained during previous test activation 410 already has sufficiently great energy so that it is possible to infer the striking of magnet armature 104 on its upper lift stop.

If this is not the case, the activation period is increased—see step 440—and a new method cycle 410, 420 is performed.

Otherwise, the method branches directly from step 430 to step 450, which corresponds to the reaching of a full lift by magnet armature 104.

A particularly simple and precise evaluation for recognizing the striking of magnet armature 104 on its upper lift stop may be carried out by selecting the detection time range for structure-borne-noise signal S to be evaluated, so that the detection time range does not include the actual instant valve needle 110 strikes its valve seat. This ensures that the structure-borne-noise signals arising in this connection are not mistakenly interpreted as structure-borne-noise signals such as occur when magnet armature 104 strikes its upper lift stop.

Moreover, it is also possible to apply separation algorithms to acquired structure-borne-noise signal S, which detect, for example, whether just one closing noise (striking of valve needle 110 on valve seat) or two noise events (full lift of magnet armature 104 and striking of valve needle 110 on valve seat) are occurring, and which permit a separation of the corresponding signal components.

The minimal activation period actually necessary for reaching the upper lift stop of magnet armature 104 may be used, just like the pickup time ascertained, for calibrating the injection characteristic curve of injection valve 100.

The operational method is carried out exceedingly advantageously at different operating points, e.g., at different fuel-pressure values, so that a precise operation of injection valve 100 is possible over a large operating range using the injection characteristic curve.

On one hand, the operational method may be carried out particularly advantageously during a regular operation of injection valve 100, in order to evaluate structure-borne-noise signals occurring in this context.

The implementation of the operational method using separate test activations is possible—see the variants of described with reference to FIGS. 4, 7.

In general, it is advantageous to position the test activations in time such that the structure-borne-noise signals to be evaluated are as free as possible from interference signals. For example, the test activations and the suitably selected detection time ranges for sensing structure-borne-noise signals S resulting in this context may be selected such that structure-borne-noise signals generated by a valve operation of internal combustion engine 10 or by other components do not fall in the detection time ranges considered.

Furthermore, it is especially advantageous to carry out the method at relatively low speeds of internal combustion engine 10, particularly at speeds below one half the maximum speed of internal combustion engine 10, optimally at approximately 500 to 1500 revolutions per minute, because the signal to noise ratio for the evaluation of the structure-borne-noise signals is particularly great in the low speed range.

The calibration, that is, the formation or modification of control variables for future activations as a function of the evaluation of structure-borne-noise signal S may advantageously be carried out during the entire operating time of injection valve 100.

Alternatively or additionally, the calibration may also be carried out during special calibration phases, for example, at the end of a manufacturing process of injection valve 100 and/or of an internal combustion engine 10 containing injection valves 100 considered or during an inspection or servicing. This variant offers the advantage that, in contrast to a normal operation of internal combustion engine 10, particularly favorable operating parameters (e.g., speed, reduction of other interference signals) exist or may be set for the evaluation of structure-borne-noise signals S. In particular, a test activation may also be carried out in an after run or even during a standstill of internal combustion engine 10, provided, for example, a sufficient fuel pressure is still present in this case to ensure the transferability of the knowledge obtained to the normal operation.

At the end of the manufacturing process of injection valve 100, the method may be carried out both within the framework of a wet test, i.e., with injection valve 100 already filled, and within the framework of a dry test, i.e., in an unfilled state of injection valve 100, the possibility of the dry test in particular representing a less costly test method.

To ensure a torque-neutral implementation of the test activations during a normal operation of internal combustion engine 10, corresponding fuel quantities of the test activations may be subtracted from a remaining main injection.

Structure-borne-noise signals S may be detected by a plurality of structure-borne-noise sensors 48. The structure-borne-noise signals coming from individual structure-borne-noise sensors 48 may advantageously be evaluated together, in order to make it possible, for instance, to determine the plausibility of the acquired signals. Moreover, based on the customarily known mounting locations of structure-borne-noise sensors 48 in internal combustion engine 10, particularly also in relation to the mounting locations of injection valves 100, by comparing the structure-borne-noise signals of different structure-borne-noise sensors 48, it is even possible to make observations concerning propagation time, where from a corresponding phase shift between the structure-borne-noise signals, it is possible to infer their distance to a corresponding structure-borne-noise-signal source, that is, for example, an injection valve 100.

Injection valve 100 may be assigned its own structure-borne-noise sensor, which preferably is disposed directly in the area of injection valve 100 or even on injection valve 100. In this configuration, only a minor influence of interference signals results on the evaluation of the structure-borne-noise signals.

In addition to being used to calibrate individual injection valves 100, the method described herein may also be used advantageously for the equalization of a plurality of injection valves 100 of an internal combustion engine 10.

In general, the method permits a precise sensing of the actual operating state of an injection valve 100, and with that, advantageously, an adjustment of the driving of injection valve 100 in order to compensate for aging-induced effects (wear, coking, etc.) as well as inexactness in a control path for the control current, etc.

What is claimed is:

1. A method for operating an injection valve of a motor vehicle, a first component of the injection valve being disposed in a manner allowing movement relative to a second component of the injection valve and being drivable at least partially by an actuator, comprising:

detecting a structure-borne-noise signal by a structure-borne-noise sensor; and evaluating the structure-borne-noise signal to infer an operating state of the first component, the operating state indicating one of whether the first component has struck a further component of the injection valve and whether an onset of a carrying-along of the first component has occurred.

2. The method according to claim 1, wherein the injection valve is arranged as a fuel injector in an internal combustion engine.

3. The method according to claim 1, wherein the first component includes a valve needle.

4. The method according to claim 1, wherein the structure-borne-noise signal is acquired in a specifiable detection time range during an operating cycle of the injection valve which is selected as a function of at least one control variable of the actuator.

5. The method according to claim 4, wherein the detection time range is selected so that it includes an estimated instant of impact at which the first component strikes the further component of the injection valve, the further component including at least one of (a) valve seat and (b) a lift stop.

6. The method according to claim 1, wherein an actual instant of impact at which the first component strikes the further component of the injection valve, the further component including at least one of (a) a valve seat and (b) a lift stop, is ascertained by evaluating the structure-borne-noise signal.

7. The method according to claim 1, wherein at least one of (a) the structure-borne-noise signal and (b) a signal derived from it is normalized to a reference signal, the reference signal being obtained in an operating phase of the injection valve during which the actuator is not driven.

8. The method according to claim 1, wherein at least one test activation of the actuator is carried out, during which in each instance the actuator receives different control signals, a plurality of structure-borne-noise signals corresponding in each case to different test activations being obtained, and an operating state of the first component being inferred from the plurality of structure-borne-noise signals.

9. The method according to claim 1, wherein control signals for future operating cycles of the injection valve are at least one of (a) formed and (b) modified as a function of the evaluation.

10. The method according to claim 1, wherein a structure-borne-noise signal ascertained during a regular operating cycle of the injection valve is evaluated, to ascertain an instant of impact of at least one of (a) a valve needle and (b) a magnet armature on at least one of (a) a valve seat and (b) a lift stop.

11. The method according to claim 1, wherein the structure-borne-noise signal is detected by at least one structure-borne-noise sensor of an internal combustion engine containing the injection valve.

12. The method according to claim 11, wherein structure-borne-noise signals of a plurality of structure-borne-noise sensors are evaluated together.

13. The method according to claim 1, wherein the structure-borne-noise signal is detected by a structure-borne-noise sensor assigned to the injection valve.

14. A method for operating an injection valve of a motor vehicle, a first component of the injection valve being disposed in a manner allowing movement relative to a second component of the injection valve and being drivable at least partially by an actuator, comprising:

detecting a structure-borne-noise signal by a structure-borne-noise sensor; and evaluating the structure-borne-noise signal to infer an operating state of the first component, wherein the evaluation of the structure-borne-noise signal includes at least one: (a) filtering of the structure-borne-noise signal by at least one of (i) a high-pass filtering and (ii) a band-pass filtering, to obtain a filtered structure-borne-noise signal; (b) ascertaining a power density spectrum of the structure-borne-noise signal; (c) ascertaining a signal energy of the structure-borne-noise signal; (d) generating an absolute value and integrating the absolute value of the structure-borne-noise signal; and (e) correlating the structure-borne-noise signal with a reference signal.

15. The method according to claim 14, wherein a striking of the first component on the further component of the injection valve, the further component including at least one of (a) a valve seat and (b) a lift stop, is inferred when at least one of (a) the structure-borne-noise signal, (b) a filtered structure-borne-noise signal, (c) a spectral component of the power density spectrum of the structure-borne-noise signal, and (d) the signal energy of the structure-borne-noise signal exceeds a specifiable threshold value.

16. The method according to claim 15, wherein the threshold value is modified dynamically.

17. A method for operating an injection valve of a motor vehicle, a first component of the injection valve being disposed in a manner allowing movement relative to a second component of the injection valve and being drivable at least partially by an actuator, comprising:

detecting a structure-borne-noise signal by a structure-borne-noise sensor; and evaluating the structure-borne-noise signal to infer an operating state of the first component, wherein at least one test activation of the actuator is carried out, during which in each instance the actuator receives different control signals, a plurality of structure-borne-noise signals corresponding in each case to different test activations being obtained, and an operating state of the first component being inferred from the plurality of structure-borne-noise signals, the method further comprising: preselecting a starting value, representing a minimum value, for an activation parameter of the actuator, the activation parameter including an activation period; a) implementing a first test activation using the preselected starting value for the activation parameter; b) acquiring a structure-borne-noise signal resulting during the first test activation; c) increasing the activation parameter according to a specifiable test scheme, an altered activation parameter being obtained; d) implementing a further test activation using the altered activation parameter; e) acquiring a structure-borne-noise signal resulting during the further test activation; f) repeating d), e), and f) until a specifiable abort criterion is reached.

18. The method according to claim 17, wherein a test scheme is used that provides for an increase or decrease of the activation parameter by a at least one of (a) specifiable, constant differential value and (b) a differential value that is a function of an instantaneous value of the activation parameter.

19. The method according to claim 17, wherein the starting value is selected such that the first component is not already driven by the actuator in response to the first test activation.

20. The method according to claim 19, wherein the structure-borne-noise signal resulting during the first test activation is used as reference signal for the evaluation of further structure-borne-noise signals.

21. A system, comprising: a control unit adapted to operate an injection valve of a motor vehicle, a first component of the injection valve being disposed in a manner allowing movement relative to a second component of the injection valve and being drivable at least partially by an actuator, the control unit executing the following:

detecting a structure-borne-noise signal by a structure-borne-noise sensor; and evaluating the structure-borne-noise signal to infer an operating state of the first component, the operating state indicating one of whether the first component has struck a further component of the injection valve and whether an onset of a carrying-along of the first component has occurred.

22. The control unit according to claim 21, wherein the injection valve is arranged as a fuel injector of an internal combustion engine of a motor vehicle.

* * * * *